Nov. 15, 1949　　　A. C. RUGE　　　2,488,348
ELECTRIC LOAD WEIGHING DEVICE
Filed May 1, 1944

INVENTOR
Arthur C. Ruge
BY
Attorney

Patented Nov. 15, 1949

2,488,348

UNITED STATES PATENT OFFICE 2,488,348

ELECTRIC LOAD WEIGHING DEVICE

Arthur C. Ruge, Cambridge, Mass., assignor to The Baldwin Locomotive Works, a corporation of Pennsylvania Application May 1, 1944, Serial No. 533,588

8 Claims. (Cl. 201—63)

This invention relates generally to load weighing devices and more particularly to a column type weighing cell in which the load is determined by strain (deformation) of the columns.

In a load weighing cell of the type disclosed herein the load is transmitted through a plurality of relatively slender columns, and strain gages such as of the bonded wire type disclosed in Simmons Patent 2,292,549 are mounted on the columns for determining the strain which is proportional to the load. Such columns are inherently unstable laterally because of their length and the desirability of having at least one of their ends free in the sense of being unsecured. In addition to this problem, there is also the problem of transmitting a true load to such free end weighing columns even though a highly eccentric or angularly directed load is being weighed.

It is an object of my invention to provide an improved combination of elements whereby a load, regardless of its eccentricity or angularity, may be transmitted freely and accurately in an axial direction to the weighing columns without distorting or twisting the same and without imposing complex stresses and strains in such columns.

Another object is to provide an improved column type weighing cell that is relatively simple and economical in construction, operation and maintenance and that has a high degree of sensitivity and accuracy combined with ruggedness and stability. Ruggedness combined with such stability and the other functional characteristics is particularly vital to the weighing cell inasmuch as its small size lends itself to portable use, if desired, as well as to many other uses requiring accurate weighing with a relatively inexpensive and compact device.

Figure 2:
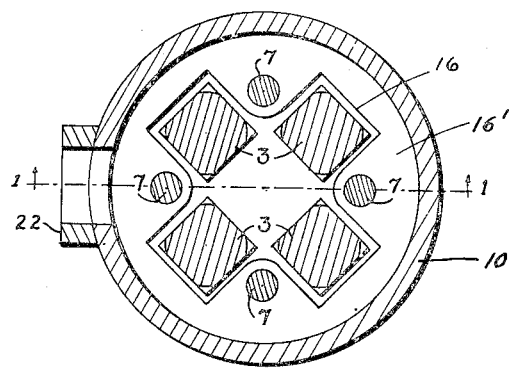
Figure 1:
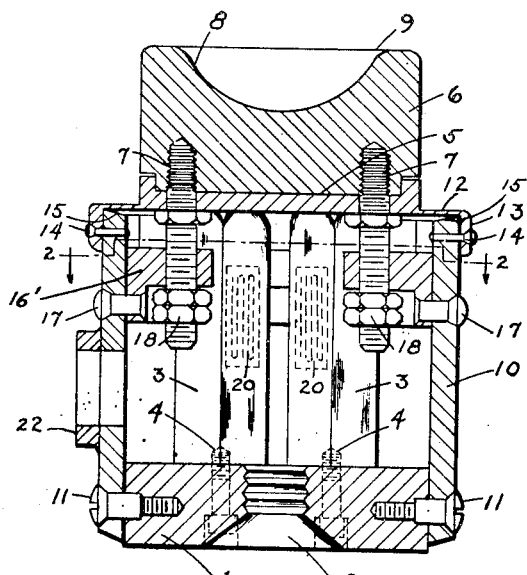

Other objects and advantages will be more apparent to those skilled in the art from the following description of the accompanying drawings in which:

Fig. 1 is a vertical section through my improved weighing cell taken substantially on the line 1—1 of Fig. 2; and Fig. 2 is a horizontal section taken substantially on the line 2—2 of Fig. 1.

In the particular embodiment of the invention disclosed herein I have shown a cell having a base 1 provided with a suitably tapered and threaded opening 2 for connection to any element upon which the weighing cell may be supported during a weighing operation. A plurality of individual weighing columns 3 are specifically shown as four in number although this may be varied in accordance with the load to be weighed or depending upon space limitations. These columns are firmly held to the base by suitable screws 4 and their upper ends have a free seating or flat abutting contact with a plate 5 to which an adapter seat 6 is connected by screws 7. The adapter is specifically shown as having a spherical recess 8 for seating a ball (not shown) which is normally mounted upon a member to be weighed. If desired, a member to be weighed may be supported upon the annular surface 9 of the adapter. The use of weighing columns 3 does not per se constitute a part of my invention except as they are part of my improved combination by which such types of weighing columns are supported. To transmit a pure axial load to the columns without any distortion thereof, notwithstanding that a highly eccentric or angularly directed load may be imposed on adapter 6, and at the same time to permit free axial transmission of the load from the adapter to the columns I have provided a heavy cylinder-like casing 10 fitted at its lower end to the preferably circular base 1 and preferably secured thereto by screws 11. The plate 5 is extended radially to form a very thin axially flexible diaphragm or annulus 12 which terminates in a relatively heavy axial flange 13 secured to the supporting shell 10 by rivets 14. The shell 10 and diaphragm 12 together with their rivets and screws constitute a means which integrally connects or fastens together the base 1 and load transmitting element 5. The upper end of the shell 10 is slightly tapered inwardly as at 15 to permit complete freedom of axial movement of plate 5 while at the same time obtaining, by reason of annulus 12 completely encircling the vertical axis of the cell, an extremely high degree of lateral rigidity in any direction. The thin diaphragm does not impose any appreciable reduction of the transmission of load through the plate 5 to the weighing columns, it being understood that the thickness of the diaphragm depends upon the load capacity and accuracy of the cell. In the case of a 40,000 lbs. capacity cell of the dimensions herein mentioned, the steel diaphragm is about $\frac{1}{32}$" thick. The small effect of the diaphragm would be included in the calibration of the cell. Since it is small, variations from linearity in its stiffness have an extremely small effect upon the linearity of the cell as a whole.

To prevent injury to the cell in case of extreme eccentric loading, the screws 7 project downwardly freely through openings in a radial supporting flange 16' which preferably extends entirely around the interior of shell 10. Suitable cut-out portions 16 are provided in the flange to receive the weighing columns 3. The supporting flange 16' is circular and is riveted at 17 to the shell at various circumferential points thereof. The screws 7 are provided with a pair of adjusting and lock nuts 18 which preferably are permitted to have .001" to .002" clearance with the underside of radial support 16'. The clearance between the screws and openings is such that the screws never contact the sides of the openings although when the diaphragm has tilted a predetermined amount under excessive eccentric loading, then one or more sets of the nuts 18 will engage the underside of the bracket and prevent further movement of the diaphragm. As shown in Fig. 2, there are four of the screws 7 thereby insuring maximum stability and safety of the diaphragm in any direction of dangerous eccentric loading.

For purposes of illustration, strain gages of the type referred to in said Simmons patent are diagrammatically indicated at 20, the bonded wire extending lengthwise of the columns preferably on opposed faces thereof. The strain gages 20 are connected by suitable electric lead wires to well-known instrumentation for measuring the change of resistance of the gage wire in response to strain of the columns arising from a load, thereby to determine the magnitude of the load in proportion to the change of electrical resistance. The wires from the gages extend through any suitable opening 22 in the shell 10. The principles of my cell are applicable to various sizes and capacities although cells of the type disclosed herein have been made as small as 2¾" diameter by 2¾" length (not including the seat 6). Gages may be placed both laterally and longitudinally of the columns for additional sensitivity as disclosed in my Patent 2,322,319. Or, inactive dummy gages may be employed for temperature compensation and to complete a bridge circuit as shown in my Patent 2,344,642.

From the foregoing disclosure it is seen that I have provided improved means in a weighing cell of the type employing the well-known principle of weighing loads in accordance with deformation of a member, whereby a true axial force may be transmitted to the weighing members or columns while still insuring a high degree of ruggedness and freedom of axial weighing movement together with precision accuracy and sensitivity in the operation of the cell. The relatively heavy shell 10 not only insures maximum ruggedness of the device but also provides an exceptionally strong lateral support for the diaphragm thereby insuring accurate response of the load transmitting elements 5 and 6, while the screws 7 and nuts 18 finally prevent twisting and damage to the diaphragm without interfering with the normal operation. When load is angularly directed the component of load at right angles to the axis is transmitted through the diaphragm into the outer shell and thence to the base. In this way the columns are relieved of bending laterally when the cell is subjected to an inclined load. The cell will thus measure only the axial component of the load, as is desirable.

It will of course be understood that various changes in details of construction and arrangement of parts may be made by those skilled in the art without departing from the spirit of the invention as set forth in the appended claims.

I claim:

1. A load weighing cell comprising, in combination, strain responsive load weighing means, a base upon which one end of said strain responsive means is supported, load transmitting means supported upon the other end of said strain responsive means, elastic flexing means fastened to said base and to said load transmitting means to prevent the base and load transmitting means from having lateral movement relative to each other but at the same time to allow free movement between the base and load transmitting means in the desired direction of strain response of said load weighing means, said means for preventing lateral movement including a cylindrical shell secured to the base and a thin annular diaphragm connected to said shell and to the load transmitting means, a plurality of members secured to said load transmitting means and extending axially of said shell internally thereof, and a bracket secured to said shell and having openings through which said members extend whereby said members and bracket are adapted to prevent injury to the cell in case of extreme eccentric loading.

2. Apparatus for measuring compression forces, comprising an assembly including a substantially rigid base member and a substantially rigid load-receiving member spaced thereabove, stress receiving means interposed between said members, electrical resistance type strain gage means associated with said stress receiving means and adapted for connection to resistance-measuring apparatus to determine the strains in the stress receiving means, said load-receiving member being formed with a peripheral flange, an annular cover portion for the assembly having an internal flange overlying said peripheral flange, said cover portion being flexible in vertical directions, a casing surrounding the space between said spaced members, the upper edges of said casing being fixed to the periphery of said cover portion, and screw means for interconnecting the lower edges of said casing with said base member.

3. In weighing apparatus, an assembly comprising a supporting member, a plurality of spaced-apart columns each having one end surface bearing against said member, another member, one surface of which bears against the surfaces at the other ends of said columns, an opposite surface of the latter member having an area for receiving the weight to be measured at a position to distribute such weight among said columns, electrical resistance type strain gauge means associated with each of said columns at positions thereon intermediate said members and adapted for connection to resistance measuring apparatus for determining variations of the total of the strains of said columns, and means free of varying frictional resistance upon varying such weight, for retaining the assembly together and preventing lateral displacement of said members with respect to said columns, without modifying the stress variations due to such weight in the column surfaces at said gage means.

4. Apparatus for measuring compression forces, comprising an assembly including two spaced members and a plurality of columns interposed therebetween whereby such columns are stressed in proportion to compression forces applied to said members in directions longitudinally of the columns, electrical resistance type strain gauge means associated with each of said columns and adapted for connection to resistance measuring apparatus to determine the strains in said columns resulting from such stressing, and a casing surrounding the space between said spaced members and affixed at one end to one of said members, the opposite end of said casing having affixed thereto a cover portion which is flexible in said longitudinal directions and extends inwardly to the other of said spaced members and is affixed thereto, such cover portion acting to prevent lateral displacement of said last named member while also retaining such member with its inner surface bearing against the end surfaces of said columns.

5. Apparatus for measuring compression forces, comprising an assembly including two spaced members and column means interposed therebetween whereby such column means is stressed in longitudinal directions as a result of compression forces applied to said members, a casing surrounding the space between said spaced members and affixed at one end to one of said members, the opposite end of said casing having affixed thereto a cover portion which is flexible in directions longitudinal of the column means and extends inwardly to the other of said spaced members and is affixed thereto, such cover portion acting to prevent lateral displacement of said last named member also retaining such member in a position bearing against said column means, and strain gage means mounted within said casing and responsive to strains resulting from said forces.

6. Apparatus for measuring compression forces, comprising an assembly including two spaced members and stress-receiving means interposed therebetween, electrical resistance type strain gage means associated with said stress-receiving means and adapted for connection to resistance-measuring apparatus to determine the resulting strains, and a casing structure for the assembly secured with respect to both of said spaced members and having an annular portion which is flexible in directions to permit changing of the spacing of said members, said stress-receiving means being secured in fixed relation to one of said members, and said casing structure acting to resiliently retain the other of said spaced members in position to bear against said stress-receiving means.

7. Apparatus for measuring compression forces, comprising an assembly including two spaced members, and a plurality of columns interposed therebetween with their end surfaces uniformly abutting said members whereby such columns are stressed in proportion to compression forces applied to said members in directions longitudinally of the columns, screw means respectively rigidly securing each of said columns firmly in its abutting relationship to one of said spaced members, said screw means extending longitudinally of the columns at their ends, relatively less rigid means for retaining the other of said spaced members against displacement in its abutting relationship with said columns, and electrical resistance type strain gauge means bonded upon the side surfaces of each of said columns and adapted for connection to resistance measuring apparatus to determine the strains in said columns resulting from such stressing.

8. Apparatus for measuring compression forces, comprising an assembly including two spaced members, stress-receiving column means interposed therebetween with the end surfaces thereof uniformly abutting said members, whereby such column means is stressed in proportion to compression forces applied to said members in directions longitudinally of the column means, means rigidly securing one of said spaced members firmly in its abutting relationship with the column means, relatively less rigid means for securing the other of said spaced members against displacement in its abutting relationship with said column means, and electrical resistance type strain gauge means bonded upon the side surfaces of said column means and adapted for connection to resistance measuring apparatus to determine the strains in said column means resulting from such stressing.

ARTHUR C. RUGE.

REFERENCES CITED

The following references are of record in the file of this patent:

UNITED STATES PATENTS

| Number | Name | Date |
| --- | --- | --- |
| 389,265 | Thomson | Sept. 11, 1888 |
| 1,772,188 | Mason | Aug. 5, 1930 |
| 2,317,701 | Ullman | Apr. 27, 1943 |
| 2,327,935 | Simmons, Jr. | Aug. 24, 1943 |